United States Patent Office 3,367,921
Patented Feb. 6, 1968

3,367,921
PROPIOTHIOLACTONE POLYMERS
Wilfred Sweeny, Wilmington, Del., and Donald James Casey, Chadds Ford, Pa., assignors to E. I. du Pont de Nemours and Company, Wilmington, Del., a corporation of Delaware
No Drawing. Filed Sept. 7, 1965, Ser. No. 485,623
3 Claims. (Cl. 260—79)

ABSTRACT OF THE DISCLOSURE

Propiothiolactones of the formula

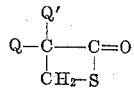

wherein Q and Q' are the same or different alkyl radicals containing from 1 to 4 carbon atoms are readily prepared and can be used to form linear polymers and copolymers easily extruded to form elastomeric fibers and films exhibiting high tensile recovery and low stress decay.

---

This invention relates to a novel class of thiolactones, and to novel polymers and copolymers prepared therefrom. The invention also comprehends fibers, films, and other shaped articles exhibiting highly valuable properties prepared from the novel polymers and copolymers.

In accordance with this invention, it has been found that 2,2-dialkyl-3-propiothiolactones, I 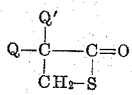

wherein Q and Q' are the same or different alkyl radicals containing from 1 to 4 carbon atoms which optionally, may be joined by carbon-to-carbon bonds to form an alicyclic ring, can be readily prepared and have excellent utility in the preparation of linear polymers. The polymers are easily extruded in the melt to form elastomeric fibers and films exhibiting high tensile recovery and low stress decay. Valuable copolymers are also readily prepared.

A useful method for preparing the novel thiolactones comprises reaction of a 3-bromo-2,2-dialkylpropionyl chloride with sodium sulfide under mild conditions:

II 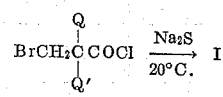

wherein Q and Q' have the significance given above. A convenient medium in which the reaction may be carried out is dimethylacetamide. Other 3-halo derivatives may be employed in place of the 3-bromo derivative, and acid halides other than the acid chloride may be used; however, the 3-bromo-2,2-dialkylpropionyl chlorides are preferred starting materials because the preparation of the thiolactone proceeds smoothly and in good yield.

EXAMPLE 1

*2,2-dimethyl-3-propiothiolactone*

A mixture of 181 g. (1.0 mol) of bromopivalic acid and 250 ml. of thionyl chloride is heated under reflux for 3.5 hours. The pressure is then reduced and excess thionyl chloride is stripped off, after which the residue is distilled. The product, bromopivaloyl chloride, has a boiling point of 72° at 17 mm. and a refractive index at 26° C. of 1.4778. In a series of such preparations, the yield varies from 66 to 88%.

To a suspension of 27.8 g. (0.35 mol) of anhydrous sodium sulfide in 150 ml. of distilled dimethylacetamide is added 65.2 g. (0.32 mol) of bromopivaloyl chloride. The acid chloride is added over a period of about 45 minutes, using a cooling bath to maintain the reaction temperature at about 20° C. After all the acid chloride is added, the cooling bath is removed and the temperature is allowed to rise to about 32° C. After 30 minutes at this temperature, the suspension is poured into a mixture of ice water and ether, the water phase is extracted with ether, and the combined ether layers are washed with a saturated sodium chloride solution and dried over anhydrous magnesium sulfate. The pressure is reduced to strip off the excess ether and the residue is distilled at a pressure of 23 mm. of mercury. The product, 2,2-dimethyl-3-propiothiolactone, has a boiling point of 63.5–64° C. at 23 mm. of mercury and a refractive index at 25.6° C. of 1.4798. Vapor phase chromatography of a sample of the product indicates that it is in excess of 99% pure. The product is stored in Dry Ice.

*Analytical data.*—Calculated for $C_5H_8OS$: C, 51.67; H, 6.93; O, 13.76; S, 27.59%. Found: C, 51.70, 51.66; H, 6.92, 6.90; O, 14.63, 14.44; S, 27.61, 27.48%.

EXAMPLE 2

*2,2-diethyl-3-propiothiolactone*

In a 3-l. flask equipped with stirrer, condenser, and thermometer, 800 g. (3.8 mol) of 2-ethyl-2-bromomethylbutyric acid and 1250 g. of thionyl chloride are refluxed gently for 3.2 hours, during which time the temperature of the reaction mixture rises from 58° to 97° C. The excess thionyl chloride is stripped off through a Claisen head by increasing the temperature of the flask to 150° C.; following which the residual liquid is distilled at a pressure of 15 mm. of mercury. The product, 2-ethyl-2-bromomethylbutyryl chloride, has a boiling point of 93–94° C. at 15 mm. of mercury and a refractive index at 27° C. of 1.4829. The yield is 834 grams (96% of theory).

In a 3-l. flask equipped with stirrer, condenser with drying tube, thermometer, and addition funnel is placed 160 g. of thoroughly dried sodium sulfide having an estimated $Na_2S$ content of 1.86 mol and 1100 ml. of dimethylacetamide. A solution of 400 g. (1.76 mol) of 2-ethyl-2-bromomethylbutyryl chloride in 400 ml. of dimethyl acetamide is added over a period of one hour while maintaining the reaction mixture at 20°±3° C. with external cooling. The reaction mixture is stirred at room temperature for 1.5 hours, and is then poured with stirring into 3 l. of crushed ice, after which this mixture is stirred for one hour. The mixture is extracted three times with 800 ml. portions of ether and the combined extracts are washed twice with 800 ml. portions of water, twice with 800 ml. portions of 5% sodium bicarbonate solution, and twice more with 800 ml. portions of water. The ether solution is dried with sodium sulfate, after which the drying agent is filtered off and the ether is stripped off on the steam bath. The residual liquid is Claisen distilled at 70–76° C. at a pressure of 10 mm. of mercury to give 119 g. (47% of theory) of crude 2,2-diethyl-3-propiothiolactone, and redistilled through a 60-cm. (24-inch) spinning band column at 78° C. at a pressure of 10 mm. of mercury.

*Analytical data.*—Calculated for $C_7H_{12}OS$: C, 58.4; H, 8.3; O, 11.1; S, 22.2%. Found: C, 58.55, 58.36; H, 8.41, 8.20; O, 11.21; S, 22.37, 22.16%.

EXAMPLE 3

*2-methyl-2-ethyl-3-propiothiolactone*

Following the general procedure of Example 2, 360 g. (1.68 mol) of 2-bromomethyl-2-methylbutyryl chloride and 145 g. of thoroughly dried sodium sulfide having an estimated Na₂S content of 1.69 mole are reacted in 1300 ml. of dimethylacetamide. The product, 2-methyl-2-ethyl-3-propiothiolactone, is obtained in a yield of 159 g. (72% of theory). It has a boiling point of 62° C. at a pressure of 12 mm. of mercury and a refractive index, after careful redistillation, of 1.4850 (27° C.).

Similarly, 2,2-pentamethylene-3-propiothiolactone may be prepared from the acid chloride of 1-bromomethyl-cyclohexane-1-carboxylic acid, and 2,2-dibutyl-3-propiothiolactone may be prepared from the acid chloride of 2-bromomethyl-2-butylcaproic acid.

The novel polymer of the invention is characterized by recurring structural units of the formula

III

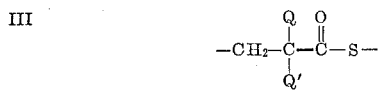

wherein Q and Q' have the same values previously ascribed. A novel polymer of this class is designated as a poly(thiocarbonyl-1,1-dialkyldimethylene), or alternately as poly(2,2-dialkyl-3-propiothiolactone). These polymers are readily prepared by adding to a thiolactone of Formula I a trace of a polymerization initiator such as tetrabutylammonium hydroxide, tetraethylammonium pivalate, tetraethylammonium chloride, or poly(tetrabutylammonium acrylate). The polymerization may be carried out in a liquid diluent. The reaction temperature is not critical; however, it has been observed that the reaction is readily carried out at a temperature in the range of about 75–125° C. After the polymers have been prepared, they may be heated to a suitable temperature in the range of about 180–300° C. and extruded to form fibers or films. In their extruded form the fibers and films are elastomeric, exhibiting low initial modulus and good tensile recovery at high elongations, up to 250% and even much higher elongations in the case of some of the polymers of the invention. When stretched to a sufficiently high elongation, the fibers and films begin to draw. In their drawn form the fibers and films are no longer elastomeric, and exhibit a much higher initial modulus and a much lower elongation.

In the examples below, the term "inherent viscosity" is defined as the polymer property determined in accordance with the following relationship:

$$\eta_{inh} = \frac{\ln \eta_{rel}}{c}$$

wherein the relative viscosity, $\eta_{rel}$, is calculated by dividing the flow time in a capillary viscometer of a dilute solution of the polymer by the flow time for the pure solvent. In the examples below, the solvent employed is either toluene or trifluoroacetic acid, as noted. The concentration (c) used in the examples is 0.5 gram of polymer per 100 ml. of solution, and a temperature of 30° C. is employed. It is desirable that the polymer has an inherent viscosity of at least about 0.75 for fibers, 0.5 for films, and 0.08 for blending with other polymers.

EXAMPLE 4

*Poly(thio-carbonyl-1,1-dimethyldimethylene)*

A quantity of 0.10 ml. of 0.5 N tetrabutylammonium hexyldimethylacetate (mixture of $C_9$–$C_{11}$ trialkylacetates, prepared from acids available commercially as "Versatic" acid from Shell Development Company) in benzene is heated gently in a 50-ml. flask to remove the benzene. The flask is then charged with 10.1 g. (0.087 mol) of 2,2-dimethyl-3-propiothiolactone, and the flask is swirled to mix the ingredients. A drying tube is placed on the flask, and it is then heated on the steam bath for 16 hours, resulting in a clear, colorless, somewhat rubbery, polymeric product. The product is cut up and dissolved in benzene, after which the solution is filtered and the polymer is precipitated by addition of hexane to the stirred solution. The precipitated polymer is filtered off and dried at 50° C. at a pressure of 2 mm. of mercury until no additional loss in weight is observed. The yield of the product, poly(thio-carbonyl-1,1-dimethyldimethylene), is 8.6 g. (85% of theory). It has an inherent viscosity of 1.34 in toluene.

*Analytical data.*—Calculated for $C_5H_8OS$: C, 51.67; H, 6.93; O, 13.76; S, 27.59%. Found: C, 51.72, 51.70; H, 6.84, 6.89; O, 13.9, 14.0; S, 27.00, 26.83%.

Table I shows the results of similar polymerizations employing a variety of catalytic conditions.

In still another experiment, 10.1 g. (0.087 mol) of 2,2-dimethyl-3-propiothiolactone is mixed with 7.1 g. of hexamethyldisiloxane, and the mixture is heated at 102° C. To the mixture is added 0.10 ml. of 0.5 N solution of tetrabutylammonium hexyldimethylacetate in benzene, and heating is continued for 2.8 hours. Upon cooling, a solid precipitates, and this is purified as described above. The product, poly(thio-carbonyl-1,1-dimethyldimethylene), has an inherent viscosity of 0.89 in toluene. The yield is 5 g. (50% of theory).

A sample of poly(thio-carbonyl-1,1-dimethyldimethylene) is melt-spun at 185° C. through an orifice of 0.5 mm. (20 mils) in diameter at a wind-up speed of 6 meters/min. (6.6 p.p.m.) to form an 0.5 mm. (20 mil) filament. An elongation of 262% and an initial modulus of 0.011 g.p.d. is exhibited by the as-spun filament after heating it at 100° C. for 5 minutes. A sample of the heated filament is also subjected to a two-cycle stretching test in which it is stretched over a period of 30 seconds to a total elongation of 50%, held at this elongation for one minute, allowed to retract over a period of 30 seconds, and reclamped to remove slack; after which it is stretched, held, and retracted again under the same conditions. The stress decay during the holding period in the second cycle is 25.7%, and the tensile recovery in the second cycle is 69.7%.

The as-spun filament is then drawn 20× by hand, after which it is found to have a tenacity of 1.4 g.p.d., an elongation of 45%, an initial modulus of 12 g.p.d., and a tensile recovery at 10% elongation of 80%.

TABLE I.—PREPARATION OF POLY(THIO-CARBONYL-1,1-DIMETHYLDIMETHYLENE)

| Catalyst | Wt. of lactone,[1] g. | Wt. of Catalyst, g. | Reaction Conditions | Yield | $\eta_{inh}$[2] |
|---|---|---|---|---|---|
| 1. Triethylenediamine | 0.25 | 0.005 | 80° C. (54 hrs.), then room temperature (48 hours). | 63% | 0.45 |
| 2. Tetraethylammonium Pivalate | 0.25 | 0.005 | ...do... | Quantitative | 0.72 |
| 3. Tetraethylammonium Chloride | 0.25 | 0.005 | ...do... | 92% | 0.89 |
| 4. Phosphorus Pentafluoride | 0.25 | 0.02 | Room temperature (18 hours) | Quantitative | 0.76 |
| 5. None | 2.75 | | 100° C. (48 hours) | 25% | 0.78 |

[1] 2,2-dimethyl-3-propiothiolactone.
[2] Inherent viscosity determinations carried out in trifluoroacetic acid as the solvent.

EXAMPLE 5

*Poly(thio-carbonyl-1,1-diethyldimethylene)*

A quantity of 0.04 ml. of 1.0 N tetrabutylammonium hexyldimethylacetate in benzene is placed in a 25 ml. flask, and the flask is heated gently to remove the benzene. The flask is charged with 3.5 g. (0.024 mol) of 2,2-diethyl-3-propiothiolactone, after which the flask is swirled to mix the ingredients and is then heated on a steam bath for 19 hours. The resulting product is a rubbery polymer. It is dissolved in 75 ml. of tetrahydrofuran and reprecipitated by addition of 200 ml. of water. After standing overnight in the solvent mixture, the rubbery mixture becomes hard. It is pulverized twice by agitation with water in a high-speed mixer and is then dried at a pressure of approximately 1 mm. of mercury. The product, poly(thio-carbonyl-1,1-diethyldimethylene), is obtained in a yield of 2.4 g. (68% of theory). It has an inherent viscosity of 0.85 in toluene.

*Analytical data.*—Calculated for $C_7H_{12}OS$: C, 58.3; H, 8.3; S, 22.2%. Found: C, 57.90, 57.87; H, 8.17, 8.35; S, 22.13%.

Elastomeric fibers are readily pulled from the melt of poly(thio-carbonyl-1,1-diethyldimethylene).

EXAMPLE 6

*Poly(thio-carbonyl-1-methyl-1-ethyldimethylene)*

A quantity of 0.25 ml. of 0.5 N tetrabutylammonium hexyldimethylacetate in benzene is placed in a flask and heated gently to remove the benzene. The flask is charged with 18.0 g. (0.139 mol) of 2-methyl-2-ethyl-3-propiothiolactone and swirled to mix the ingredients. A drying tube is placed on the flask, and the mixture is allowed to stand at room temperature for 1.5 hours. It is then heated on the steam bath for 16 hours. The resulting product, a clear rubbery solid, is cut up and dissolved in benzene. Hexane is added to precipitate the product, and after the precipitated product is separated it is worked in several portions of hexane to solidify the product. Finally, it is dried at 50° C. and a pressure of 2 mm. of mercury. The product, poly(thio - carbonyl - 1 - methyl - 1 - ethyldimethylene), is a foamy, white rubbery solid having an inherent viscosity of 1.02. The yield is 14.0 g. (78% of theory).

*Analytical data.*—Calculated for $C_6H_{10}OS$: C, 55.2; H, 7.7; S, 24.6%. Found: C, 55.0, 55.0; H, 7.53; 7.47; S, 24.55, 24.48%.

A sample of poly(thio-carbonyl-1-methyl - 1 - ethyldimethylene) is melt-pressed to form a clear, flexible, elastic film. The film has an elongation of 790% and an initial modulus of 0.015 g.p.d.

A sample of poly(thio-carbonyl-1-methyl - 1 - ethyldimethylene) is press-spun through an orifice 0.5 mm. (20 mils) in diameter, the resulting extruded filament being wound up at 9.1 meters/min. (30 feet/min.). The filament has an elongation of 460% and an initial modulus of 0.023 g.p.d.

While the novel polymer is essentially comprised of recurring thioester structural units as shown in Formula III, the invention also comprehends its copolyesters containing up to about 60% of recurring structural units of the formula IV
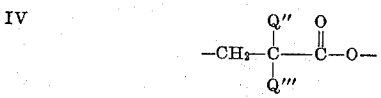

wherein Q″ and Q‴ are the same or different alkyl radicals containing from 1 to 4 carbon atoms which may optionally be joined by carbon-to-carbon bonds to form an alicyclic ring. In a preferred method for preparing such copolymers, the thiolactone is first polymerized in the absence of a diluent; a solvent such as tetrahydrofuran is then added together with a 2,2-dialkyl-3-propiolactone; and the latter is then polymerized from the ends of the previously formed thiolactone polymer segments to form a block copolymer. The following examples illustrate the preparation of copolymers.

EXAMPLE 7

*Poly(thio-carbonyl-1-methyl-1-ethyldimethylene/oxy-carbonyl-1,1-dimethyldimethylene)*

A quantity of 0.6 ml. of a tetrahydrofuran solution containing 0.080 g. of poly(tetrabutylammonium acrylate) per ml. of solution is placed in a 250-ml. flask equipped with a stirrer and condenser with drying tube, after which 21.1 g. (0.162 mol) of 2-methyl-2-ethyl-3-propiothiolactone is added. The flask is immersed in an oil bath maintained at 92° C. for 3.1 hours while stirring is continued. At the end of this period, 125 ml. of tetrahydrofuran is added and the flask is immersed in a 60° C. water bath while stirring is continued. After two hours, during which time the mixture becomes a clear solution, the solution is cooled and 2.5 g. of pivalolactone is added. Upon standing overnight, the solution becomes a soft gel. The gel is boiled for one hour in 500 ml. of hexane. The liquid is decanted from the resulting rubbery, white polymer, and the latter is then boiled for four hours in 500 ml. of benzene. The gelatinous mixture is cooled and 500 ml. of hexane is added, after which the mixture is allowed to stand overnight. The liquid is decanted and an additional 500 ml. of hexane is added. The product is filtered off, cut into small pieces, and dried. The resulting rubbery, white solid contains 18.9% sulfur by analysis, corresponding to 73 mol percent of the sulfur-containing recurring structural unit. The yield of the product, poly(thio-carbonyl-1-methyl - 1 - ethyl - dimethylene/oxy - carbonyl - 1,1 - dimethyldimethylene) (73/27), is 9.9 g.

A sample of poly(thio-carbonyl-1-methyl-1-ethyl-dimethylene/oxy-carbonyl-1,1-dimethyldimethylene) (73/27) is melt-spun at 255° C. through an orifice 0.3 mm. (12 mils) in diameter, the resulting extruded filament being passed into ice water and wound at 14.6 meters/min. (16 y.p.m.). The filament exhibits an elongation of 520% and an initial modulus of 0.74 g.p.d.

In a similar experiment, the same procedure is followed except that 0.6 ml. of a tetrahydrofuran solution containing 0.078 g. tetrabutylammonium hexyldimethylacetate per ml. of solution is employed as an initiator, and 6.1 g. of pivalolactone is used. The product, as determined by analysis, is poly(thio-carbonyl-1-methyl-1-ethyl-dimethylene/oxy-carbonyl - 1,1 - dimethyldimethylene) (55/45). A sample of the copolymer is melt pressed to form a film which, when drawn by hand, exhibits an elongation of 200%. In another experiment, 0.6 ml. of a 6.6% solution of tetrabutylammonium adipate in tetrahydrofuran is used as the initiator and the procedure followed is the same, employing 6.1 g. of pivalolactone. The product, as determined by analysis, is poly(thio-carbonyl-1-methyl-1 - ethyldimethylene/oxy-carbonyl-1,1-dimethyldimethylene) (41/59). A film melt-pressed from this polymer exhibits an elongation of 150% after drawing by hand.

In another experiment, the same procedure is followed, except that 0.29 ml. of a 10% solution of tetrabutylammonium adipate in tetrahydrofuran is used as the initiator and 2.2 g. of pivalolactone is used. The product, as determined by analysis, is poly(thio-carbonyl-1-methyl-1-ethyldimethylene/oxy-carbonyl - 1,1 - dimethyldimethylene) (92/8). A sample of this product melt-spun at 250° C. through an orifice 0.3 mm. (12 mils) in diameter and wound at 6 meters/min. (6.6 y.p.m.) exhibits an elongation of 1211% and an initial modulus of 0.022 g.p.d.

EXAMPLE 8

*Poly(thio-carbonyl-1,1-dimethyldimethylene/oxy-carbonyl-1,1-dimethyldimethylene)*

Two g. of a mixture of 90 wt. percent 2,2-dimethyl-3-propiothiolactone and 10 wt. percent pivalolactone as determined by vapor phase chromatography, is mixed with 0.02 g. tetraethylammonium pivalate, and the mixture is heated at 100° C. The mixture becomes solid in about 30 minutes. Heating is continued for a total of 48 hours, after which the solid is cut up and soaked in ethanol. The infrared spectrum of the product shows both

carbonyl absorption at 5.75μ and

carbonyl absorption at 5.95μ. The product, poly(thio-carbonyl-1,1 - dimethyldimethylene/oxy-carbonyl-1,1-dimethyldimethylene), has an inherent viscosity of 0.33 in trifluoroacetic acid. The yield is 92%. In a similar experiment in which 0.02 g. of tetraethylammonium chloride is substituted for the tetraethylammonium pivalate, the inherent viscosity is 0.38 and the yield is 86%.

In another experiment, the general procedure of Example 7 is employed to polymerize 2,2-dimethyl-3-propiothiolactone in the presence of 0.00065 mol of tetrabutylammonium adipate per mol of 2,2-dimethyl-3-propiothiolactone, followed by the addition of 0.33 mol pivalolactone per mol of 2,2-dimethyl-3-propiothiolactone. By analysis the product comprises poly(thio-carbonyl-1,1 - dimethyldimethylene/oxy-carbonyl - 1,1-dimethyldimethylene) (60/40). A film formed from a sample of the product is drawn to a tough, flexible film.

What is claimed is:

1. A polymer consisting essentially of the following recurring structural units

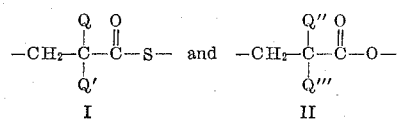

with up to about 60% of the recurring units being II, and wherein Q, Q', Q" and Q''' are alkyl radicals of from 1 to 4 carbon atoms, with the proviso that Q and Q' may be joined to form an alicyclic ring and Q" and Q''' may be joined to form an alicyclic ring.

2. Poly(thio-carbonyl - 1 - methyl-1-ethyldimethylene/oxy-carbonyl-1,1-dimethyldimethylene).

3. Poly(thio-carbonyl - 1,1-dimethyldimethylene/oxy-carbonyl-1,1-dimethyldimethylene).

References Cited

UNITED STATES PATENTS 2,978,460    4/1961    Bartlett et al. _____ 260—79

FOREIGN PATENTS 840,658    6/1960    Great Britain.

OTHER REFERENCES

Linkova et al.: Bull. Acord. Sci. (U.S.S.R.), 1955, pp. 507–8.

Linkova et al.: Bull Acord. Sci. (U.S.S.R.), 1964, pp. 600–605.

Weissberger: "The Chemistry of Heterocyclic Compounds," vol. 19, part 2, pp. 849, 853 and 858–9, 1964.

DONALD E. CZAJA, *Primary Examiner.*

LEON J. BERCOVITZ, *Examiner.*

M. I. MARQUIS, *Assistant Examiner.*